(12) United States Patent
Wang et al.

(10) Patent No.: US 11,323,433 B2
(45) Date of Patent: May 3, 2022

(54) DIGITAL CREDENTIAL MANAGEMENT METHOD AND DEVICE

(71) Applicant: CHINA IWNCOMM CO., LTD., Shaanxi (CN)

(72) Inventors: Yuehui Wang, Shaanxi (CN); Bianling Zhang, Shaanxi (CN); Manxia Tie, Shaanxi (CN); Xiaolong Lai, Shaanxi (CN); Qin Li, Shaanxi (CN); Weigang Tong, Shaanxi (CN); Guoqiang Zhang, Shaanxi (CN); Zhiqiang Du, Shaanxi (CN); Xiang Yan, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 298 days.

(21) Appl. No.: 16/645,149

(22) PCT Filed: Sep. 7, 2018

(86) PCT No.: PCT/CN2018/104647
§ 371 (c)(1),
(2) Date: Mar. 6, 2020

(87) PCT Pub. No.: WO2019/047927
PCT Pub. Date: Mar. 14, 2019

(65) Prior Publication Data
US 2020/0328902 A1 Oct. 15, 2020

(30) Foreign Application Priority Data

Sep. 7, 2017 (CN) .......................... 201710802333.X

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3236* (2013.01); *H04L 9/3268* (2013.01);
(Continued)

(58) Field of Classification Search
CPC .................................................. H04L 63/0823
See application file for complete search history.

(56) References Cited

U.S. PATENT DOCUMENTS

| 2002/0069361 | A1 | 6/2002 | Watanabe et al. |
| 2002/0165912 | A1* | 11/2002 | Wenocur .............. G06Q 10/107 709/203 |

(Continued)

FOREIGN PATENT DOCUMENTS

| CN | 101547095 A | 9/2009 |
| CN | 103186719 A1 | 7/2013 |

(Continued)

*Primary Examiner* — Bradley W Holder
(74) *Attorney, Agent, or Firm* — Arent Fox Schiff LLP; Michael Fainberg

(57) ABSTRACT

Provided in the present invention are a digital credential management method and a device, the method comprising: a digital credential application device negotiating establishment of a secure data channel with a digital credential issuing device, and sending to the digital credential issuing device a digital credential management request message; the digital credential issuing device receiving the message, and sending to the digital credential application device a digital credential management verification request message; the digital credential application device receiving the verification request message, and sending to the digital credential issuing device a digital credential management verification response message; the digital credential issuing device receiving the digital credential management verification response message, and sending to the digital credential application device a digital credential management response message; the digital credential application device receiving (Continued)

the digital credential management response message, and sending to the digital credential issuing device a digital credential management confirmation message.

23 Claims, 5 Drawing Sheets

(52) U.S. Cl.
CPC ........ H04L 63/0428 (2013.01); H04L 63/061 (2013.01); H04L 63/123 (2013.01)

(56) References Cited

U.S. PATENT DOCUMENTS

| | | | |
|---|---|---|---|
| 2005/0138386 A1* | 6/2005 | Le Saint | H04L 9/3226 713/185 |
| 2008/0082818 A1* | 4/2008 | Kim | H04L 63/06 713/156 |
| 2010/0257358 A1 | 10/2010 | Grajek et al. | |
| 2013/0019093 A1 | 1/2013 | Seidi et al. | |
| 2015/0058634 A1 | 2/2015 | Watsen | |
| 2018/0159845 A1* | 6/2018 | Aronov | H04L 63/0435 |

FOREIGN PATENT DOCUMENTS

| | | |
|---|---|---|
| CN | 103190129 A1 | 7/2013 |
| CN | 103856478 A | 6/2014 |
| CN | 104160656 A | 11/2014 |
| CN | 104579662 A1 | 4/2015 |
| CN | 104683359 A1 | 6/2015 |
| CN | 105812136 A | 7/2016 |
| JP | 2005160005 A | 6/2005 |
| JP | 2007329731 A | 12/2007 |
| JP | 200898990 A | 4/2008 |
| WO | 2009001855 A1 | 12/2008 |
| WO | 2011120583 A1 | 10/2011 |

* cited by examiner

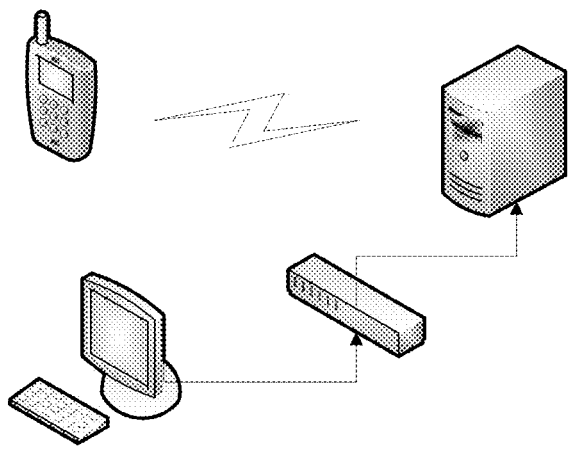

Fig. 1

| | |
|---|---|
| The digital certificate requesting device negotiates, with the digital certificate issuing device, establishment of the secure data channel using an obtained authorization code and generates a security key, where the security key includes a data communication key | S201 |
| The digital certificate requesting device uses the secure data channel to transmit to the digital certificate issuing device, the digital certificate management request message, the digital certificate management request message being encrypted via the data communication key | S202 |
| The digital certificate issuing device receives the digital certificate management request message and uses the secure data channel to transmit to the digital certificate requesting device, the digital certificate management response message, the digital certificate management response message being encrypted via the data communication key | S203 |
| The digital certificate requesting device receives the digital certificate management response message and uses the secure data channel to transmit to the digital certificate issuing device, a digital certificate management confirmation message, the digital certificate management confirmation message being encrypted via the data communication key | S204 |
| The digital certificate issuing device receives and processes the digital certificate management confirmation message | S205 |

DIGITAL CREDENTIAL MANAGEMENT METHOD AND DEVICE

The present application is a US National Stage of International Application No. PCT/CN2018/104647, filed on Sep. 7, 2018, which claims the priority from Chinese Patent Application No. 201710802333.X, filed with the Chinese Patent Office on Sep. 7, 2017 and entitled "Digital certificate Management Method and Device", which is hereby incorporated by reference in its entirety.

FIELD

The present disclosure relates to the technical field of network security, in particular to a digital certificate management method and device.

BACKGROUND

With the development of a network security technology, it has become an important issue for study of how to ensure confidentiality and integrity of network information transmission. Using digital certificate is a manner of authenticating an identity of a network communication entity and a digital certificate technology may be used to encrypt data, authenticate an identity and the like. The digital certificate, which is generally issued by a digital certificate issuing device to a digital certificate requesting device, may be used to recognize an identity of the digital certificate requesting device.

In the prior art, there is an automatic application method of the digital certificate, which is used to application, update and issuing of the digital certificate within a wireless local area network (WLAN). In the method, the digital certificate requesting device may transmit a message to the digital certificate issuing device through the WLAN to notify a digital certificate generation method supported by the digital certificate requesting device, such that the digital certificate issuing device generates a new digital certificate. In the method, a message transmitted between the digital certificate requesting device and the digital certificate issuing device is transmitted as clear text and the two devices check integrity of the message only to determine that the message is not tampered. This manner can ensure integrity of data only, without performing effective protection for authenticity and confidentiality of the data. In particular, when the digital certificate requesting device and the digital certificate issuing device interact the data through other network forms, there is a disadvantage of low security with this manner since the message is transmitted in the clear text.

SUMMARY

The present disclosure provides a digital certificate management method and device. A secure channel for data transmission may be established between a digital certificate requesting device and a digital certificate issuing device and a message transmitted between the two devices is transmitted in an encrypted manner, thereby effectively improving security of digital certificate management.

In view of this, the present disclosure provides the following technical solutions.

In a first aspect, the present disclosure provides the digital certificate management method, including: negotiating, by a digital certificate requesting device, with a digital certificate issuing device, establishment of a secure data channel using an obtained authorization code and generating a security key, wherein the security key at least comprises a data communication key; transmitting, by the digital certificate requesting device, a digital certificate management request message to the digital certificate issuing device using the secure data channel, the digital certificate management request message being encrypted via the data communication key; receiving, by the digital certificate issuing device, the digital certificate management request message and transmitting a digital certificate management verification request message to the digital certificate requesting device using the secure data channel, the digital certificate management verification request message being encrypted via the data communication key; receiving, by the digital certificate requesting device, the digital certificate management verification request message and transmitting a digital certificate management verification response message to the digital certificate issuing device using the secure data channel, the digital certificate management verification response message being encrypted via the data communication key; receiving, by the digital certificate issuing device, the digital certificate management verification response message and transmitting a digital certificate management response message to the digital certificate requesting device using the secure data channel, the digital certificate management response message being encrypted via the data communication key; receiving, by the digital certificate requesting device, the digital certificate management response message and transmitting a digital certificate management confirmation message to the digital certificate issuing device using the secure data channel, the digital certificate management confirmation message being encrypted via the data communication key; and receiving and processing, by the digital certificate issuing device, the digital certificate management confirmation message.

In a second aspect, the present disclosure provides the digital certificate management device, including a secure data channel establishing unit configured to negotiate with a digital certificate issuing device, establishment of a secure data channel using an obtained authorization code and generate a security key, wherein the security key at least comprises a data communication key; a transmitting unit configured to transmit a digital certificate management request message to the digital certificate issuing device using the secure data channel, the digital certificate management request message being encrypted via the data communication key, further configured to transmit a digital certificate management verification response message to the digital certificate issuing device using the secure data channel, the digital certificate management verification response message being encrypted via the data communication key, and further configured to transmit a digital certificate management confirmation message to the digital certificate issuing device using the secure data channel, the digital certificate management confirmation message being encrypted via the data communication key; an encryption unit configured to encrypt the certificate management request message using the data communication key, to encrypt the digital certificate management verification response message using the data communication key, and to encrypt the digital certificate management confirmation message using the data communication key; a receiving unit configured to receive a digital certificate management verification request message transmitted by the digital certificate issuing device using the secure data channel, the digital certificate management verification request message being encrypted via the data communication key, and to receive a digital certificate management response message transmitted by the digital certificate issuing device using the secure data channel, the digital certificate management response message being encrypted via the data communication key; and a processing unit configured to process the received digital certificate management verification request message and generate the digital certificate management verification response message, and to process the received digital certificate management response message and generate the digital certificate management confirmation message.

In a third aspect, the present disclosure provides a device for digital certificate application, including a memory, and one or more programs, wherein the one or more programs are stored in the memory and configured to execute, by one or more processors, instructions included in the one or more programs and configured to: negotiate, with a digital certificate issuing device, establishment of a secure data channel using an obtained authorization code and generate a security key, wherein the security key at least comprises a data communication key; generate a digital certificate management request message; encrypt the digital certificate management request message using the data communication key; transmit the digital certificate management request message to the digital certificate issuing device using the secure data channel, the digital certificate management request message being encrypted via the data communication key; receive a digital certificate management verification request message transmitted by the digital certificate issuing device using the secure data channel, the digital certificate management verification request message being encrypted via the data communication key; process the digital certificate management verification request message and generate a digital certificate management verification response message; encrypt the digital certificate management verification response message using the data communication key; transmit the digital certificate management verification response message to the digital certificate issuing device using the secure data channel, the digital certificate management verification response message being encrypted via the data communication key; receive a digital certificate management response message transmitted by the digital certificate issuing device using the secure data channel, the digital certificate management response message being encrypted via the data communication key; process the digital certificate management response message and generate a digital certificate management confirmation message; encrypt the digital certificate management confirmation message using the data communication key; and transmit the digital certificate management confirmation message to the digital certificate issuing device using the secure data channel, the digital certificate management confirmation message being encrypted via the data communication key.

In a fourth aspect, the present disclosure provides the digital certificate issuing device, the device including a secure data channel establishing unit configured to negotiate, with a digital certificate requesting device, establishment of a secure data channel using an authorization code and generate a security key, wherein the security key at least comprises a data communication key; a receiving unit configured to receive a digital certificate management request message transmitted by the digital certificate requesting device using the secure data channel, the digital certificate management request message being encrypted via the data communication key, to receive a digital certificate management verification response message transmitted by the digital certificate requesting device using the secure data channel, the digital certificate management verification response message being encrypted via the data communication key, and to receive a digital certificate management confirmation message transmitted by the digital certificate requesting device using the secure data channel, the digital certificate management confirmation message being encrypted via the data communication key; a processing unit configured to process the received digital certificate management request message and generate a digital certificate management verification request message, to process the received digital certificate management verification response message and generate a digital certificate management response message, and to process the received digital certificate management confirmation message; an encryption unit configured to encrypt the certificate management verification request message using the data communication key, and to encrypt the digital certificate management response message using the data communication key; and a transmitting unit configured to transmit the digital certificate management verification request message to the digital certificate requesting device using the secure data channel, the digital certificate management verification request message being encrypted via the data communication key, and to transmit the digital certificate management response message to the digital certificate requesting device using the secure data channel, the digital certificate management response message being encrypted via the data communication key.

In a fifth aspect, the present disclosure provides a device for digital certificate issuing, including a memory, and one or more programs, wherein the one or more programs are stored in the memory and configured to execute, by one or more processors, instructions included in the one or more programs and configured to: negotiate, with a digital certificate requesting device, establishment of a secure data channel using an authorization code and generate a security key, wherein the security key comprises a data communication key; receive a digital certificate management request message transmitted by the digital certificate requesting device using the secure data channel, the digital certificate management request message being encrypted via the data communication key; process the digital certificate management request message and generate a digital certificate management verification request message; encrypt the digital certificate management verification request message using the data communication key; transmit the digital certificate management verification request message to the digital certificate requesting device using the secure data channel, the digital certificate management verification request message being encrypted via the data communication key; receive a digital certificate management verification response message transmitted by the digital certificate requesting device using the secure data channel, the digital certificate management verification response message being encrypted via the data communication key; process the digital certificate management verification response message and generate a digital certificate management response message; encrypt the digital certificate management response message using the data communication key; transmit the digital certificate management response message to the digital certificate requesting device using the secure data channel, the digital certificate management response message being encrypted via the data communication key; and receive a digital certificate management confirmation message transmitted by the digital certificate requesting device using the secure data channel, and process the digital certificate management confirmation message, the digital certificate management confirmation message being encrypted via the data communication key.

According to the digital certificate management method and devices provided in the present disclosure, the digital certificate requesting device may negotiate, with the digital certificate issuing device, establishment of the secure data channel using the obtained authorization code, generate the security key, and encrypt the message using the generated data communication key in a message interaction process between the digital certificate requesting device and the digital certificate issuing device, thereby effectively improving security of data transmission, and it may be adapted to automatic application, query, update, revoking and revocation list obtaining etc. of a digital certificate under multiple different types of scenes. Meanwhile, the digital certificate issuing device, using a verification to which a public key and a private key pertain, checks whether the digital certificate requesting device has "a private key corresponding to the public key thereof" or not, thus detecting whether the public key and the private key of the digital certificate requesting device are replaced and are wrong etc. or not. The digital certificate issuing device may only interact the message with the digital certificate requesting device having the correct public key and the correct private key, thereby avoiding leakage of privacy data of the digital certificate requesting device and further ensuring security of a digital certificate management process.

BRIEF DESCRIPTION OF THE DRAWINGS

In order to describe the technical solution in embodiments of the present disclosures or the prior art more clearly, the accompanying figures required for use in description of the embodiments or the prior art will be described below briefly. Obviously, the accompanying figures described below are merely some embodiments disclosed in the present disclosure. Under the precondition of not paying creative labor, those of ordinary skilled in the art may obtain other accompanying figures according to these accompanying figures described below.

FIG. 1 is a schematic application scene which can be applied in an embodiment of the present disclosure;

FIG. 2 is a flow chart of a digital certificate management method provided by one embodiment of the present disclosure;

DETAILED DESCRIPTION OF THE EMBODIMENTS

Figure 3:
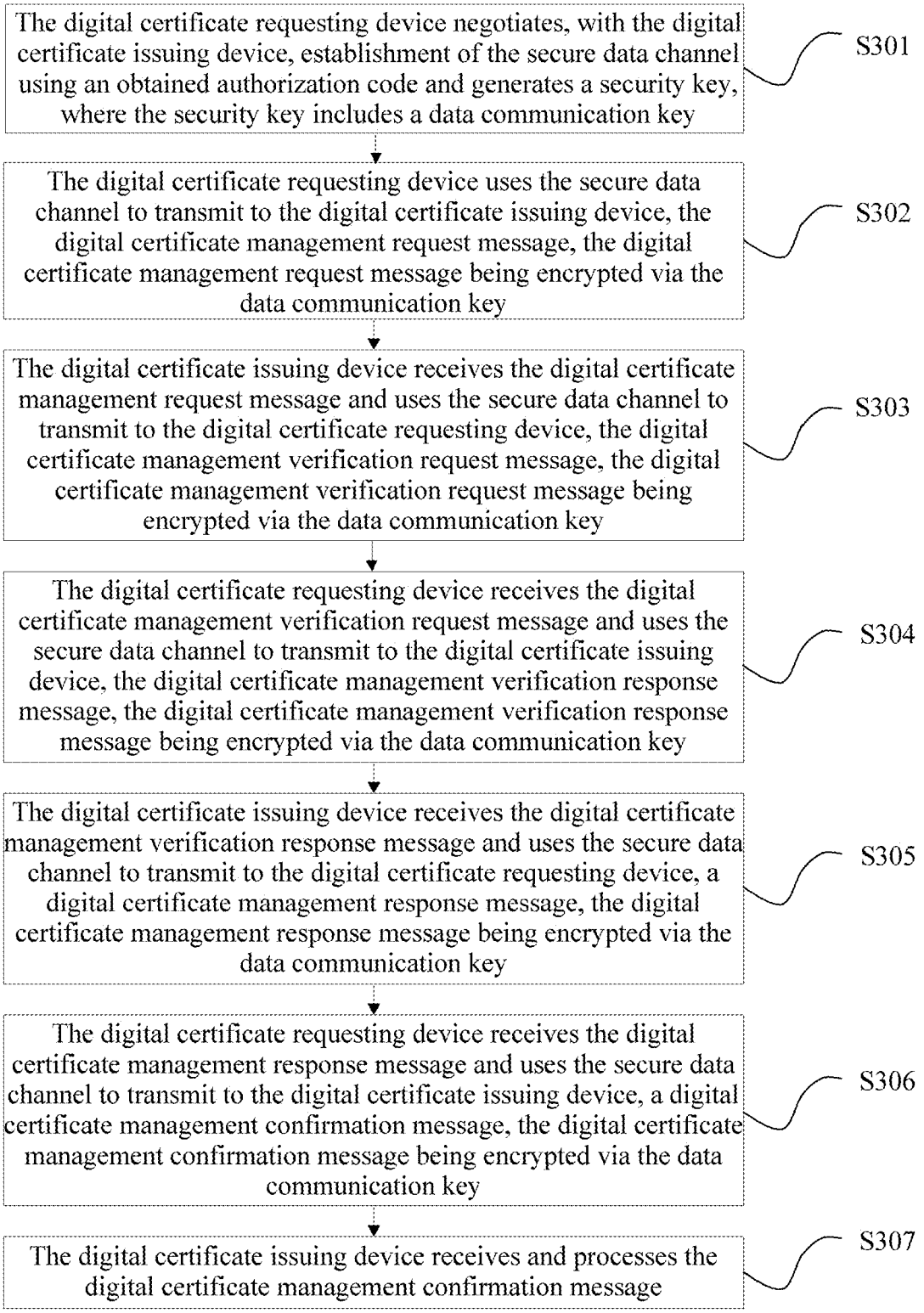
FIG. 3 is a flow chart of a digital certificate management method provided by another embodiment of the present disclosure.

An embodiment of the present disclosure provides a digital certificate management method and device. A secure channel for data transmission may be established between a digital certificate requesting device and a digital certificate issuing device and a message transmitted between the two devices is transmitted in an encrypted manner, thereby effectively improving security of digital certificate management.

In order to enable those of ordinary skilled in the art to understand the technical solution in the present disclosure better, accompanying figures in embodiments of the present disclosure will be incorporated below to describe the technical solution in embodiments of the present disclosure clearly and completely. Obviously, the embodiments described are merely a part of embodiments of the present disclosure rather than all embodiments. Based on embodiments of the present disclosure, all other embodiments obtained by those of ordinary skilled in the art under the precondition of not paying creative labor should pertain to the protection scope of the present disclosure.

Referring to FIG. 1, FIG. 1 is an exemplary application scene in an embodiment of the present disclosure. The method and device provided in the embodiment of the present disclosure may be applied to the scene as shown in FIG. 1, wherein the digital certificate requesting device and the digital certificate issuing device may be connected through a network and the connection may be any form of wired and/or wireless connection (such as WLAN, LAN, cellular, and coaxial cable). As described with FIG. 1 as an example, the digital certificate requesting device includes, but not limited to a smartphone, a non-smartphone, a tablet PC, a laptop PC, a desktop PC, a small-size computer, a medium-size computer, a large-size computer and the like which are currently existing, being researched and developed or will be researched and developed in the future. The digital certificate requesting device may apply for downloading and updating of a certificate to the digital certificate issuing device (such as a CA server of a certification center) through respectively adaptive network form. It needs to note that the embodiment of the present disclosure may be applied to multiple industries like a wireless operation network, aviation, traffic, electrical power, broadcast & radio, finance, medical treatment, education, industry and commerce. Of course, the above application scenes are merely illustrated for facilitating understanding of the present disclosure. The embodiment of the present disclosure is not restricted at all in this aspect. On the contrary, the embodiment of the present disclosure may be applied to any suitable scene.

FIGS. 2 through 6 will be incorporated below to describe the digital certificate management method shown in an exemplary embodiment of the present disclosure.

Referring to FIG. 2, FIG. 2 is a flow chart of the digital certificate management method provided by one embodiment of the present disclosure. As shown in FIG. 2, the method may include the following steps.

At step S201, the digital certificate requesting device negotiates, with the digital certificate issuing device, establishment of the secure data channel using an obtained authorization code and generates a security key, where the security key includes a data communication key.

In a specific implementation, a digital certificate applicant may request to a digital certificate issuer an authorization code for downloading the digital certificate. The digital certificate applicant for example may be the digital certificate requesting device and the digital certificate issuer for example may be the digital certificate issuing device. The present disclosure does not define a specific manner of requesting the authorization code. For example, the digital certificate applicant may request to the digital certificate issuer the authorization code through manners of a short message, an e-mail, a dedicated request and the like. The digital certificate issuer may transmit the authorization code to the digital certificate applicant through a certain manner. For example, the digital certificate issuer may transmit to the digital certificate applicant the authorization code through manners of a short message, an e-mail, a dedicated message and the like. In general, the authorization code is generated by the digital certificate issuer itself. The authorization code may be generated in real time when the digital certificate applicant requests the authorization code and it may also be generated in advance for use. In form, the authorization code may be a combination of a letter and/or a number and/or a symbol etc. with a certain length requirement. The authorization code also has a certain using term. The authorization code expires in case of being out of the using term. In a using process, the authorization codes allocated by the digital certificate issuer to different digital certificate applicants must be different.

In a specific implementation, the digital certificate requesting device may negotiate with the digital certificate issuing device establishment of the secure data channel using the obtained authorization code, the secure data channel being configured to perform security data transmission. In a process of establishing the secure data channel, the digital certificate requesting device may, using the authorization code, generate the security key. The security key may include one or more keys, the one or more keys including the data communication key. The security key may further include a data session key. The data communication key is configured to encrypt the message transmitted between the digital certificate requesting device and the digital certificate issuing device in the secure data channel. It needs to note that the security key is generated at both a digital certificate requesting device side and a digital certificate issuing device side, thereby facilitating encryption and decryption of the message. The data session key may be configured to encrypt certificate request data or certificate response data. The certificate request data are specifically data carried in a digital certificate management request message. The certificate response data are specifically data carried in a digital certificate management response message.

At step S202, the digital certificate requesting device uses the secure data channel to transmit to the digital certificate issuing device, the digital certificate management request message, the digital certificate management request message being encrypted via the data communication key.

In the present disclosure, the digital certificate management request message is processed by encryption. In particular, the data communication key generated at step S201 is used for the encryption, thus effectively improving transmission security of the message. It needs to note that the data included in the digital certificate management request message may be processed for primary encryption and may also be processed for secondary encryption. For example, when the digital certificate management request message may be transmitted in the secure data channel, the message can only be transmitted to the digital certificate issuing device after being encrypted using the data communication key. For example again, before the digital certificate management request message is transmitted, a set of keys among the security keys, e.g. the data session key, have been used to encrypt certificate request data carried in the digital certificate management request message; and upon being transmitted in the secure data channel, the message is processed for secondary encryption. In considering security, the security keys used for the two encryptions (i.e. the data communication key and the data session key) are different. A digital certificate requesting device and the digital certificate issuing device may agree on encryption times, encryption algorithms and types of the keys used for encryption in advance (i.e. the data communication key and the data session key).

At step S203, the digital certificate issuing device receives the digital certificate management request message and uses the secure data channel to transmit to the digital certificate requesting device, the digital certificate management response message, the digital certificate management response message being encrypted via the data communication key.

In particular, after receiving the digital certificate management request message, the digital certificate issuing device firstly uses the generated security key to decrypt the digital certificate management request message, and to perform processing according to the data carried in the digital certificate management request message, and then to generate the digital certificate management response message, the digital certificate management response message being transmitted to the digital certificate requesting device.

Correspondingly, in the present disclosure, the digital certificate management response message is processed for encryption. In particular, the data communication key generated at step S201 is used for the encryption, thus effectively improving transmission security of the message. It needs to note that the digital certificate management response message may be processed for primary encryption and may also be processed for secondary encryption. For example, before the digital certificate management request message is transmitted at step S202, the set of keys among the security keys, e.g. the data session key, have been used to encrypt the data included in the digital certificate management request message; and upon being transmitted in the secure data channel, the data are processed for secondary encryption using the data communication key. Correspondingly, the digital certificate management response message may also be processed for two encryptions respectively using the data session key and the data communication key. The digital certificate requesting device and the digital certificate issuing device may agree on encryption times, encryption algorithms and types of the keys used for encryption in advance (i.e. the data communication key and the data session key).

At step S204, the digital certificate requesting device receives the digital certificate management response message and uses the secure data channel to transmit to the digital certificate issuing device, a digital certificate management confirmation message, the digital certificate management confirmation message being encrypted via the data communication key;

where the digital certificate management response message is encrypted via the data communication key.

In particular, the digital certificate requesting device processes the digital certificate management response message to obtain a processing result and generates the digital certificate management confirmation message.

In a specific implementation, the present disclosure does not define a message adopted for interaction between the digital certificate requesting device and the digital certificate issuing device and an interaction manner, as the one which may realize the above information interaction to realize automatic application, query, update and issuing of the digital certificate pertains to the protection scope of the present disclosure. In some embodiments, the digital certificate management request message may include types of digital certificate application information, digital certificate obtaining information, digital certificate revoking information, digital certificate revocation list message and the like. The digital certificate management response message includes digital certificate response information.

In a specific implementation, the digital certificate requesting device decrypts and checks the digital certificate management response message to obtain a message content and determines the digital certificate for use according to the requirements to install and update the digital certificate etc.

It may be understood that in a specific implementation of the present disclosure, the digital certificate management request message carries the certificate request data and the digital certificate management response message carries the certificate response data. According to whether to encrypt the certificate request data and/or the certificate response data, a plurality of embodiments as follows may be included.

(1) The certificate request data and the certificate response data are clear text. The digital certificate management request message and the digital certificate management response message are encrypted via the data communication key of the secure channel to finish primary encryption.

At this time, the digital certificate management request message being encrypted via the data communication key includes: encrypting the digital certificate management request message via the data communication key of the secure data channel; and the digital certificate management response message being encrypted via the data communication key includes: encrypting the digital certificate management response message via the data communication key of the secure data channel.

(2) When the security key further includes the data session key, the data session key is used to process the certificate request data for primary encryption, but the certificate response data are not encrypted, but to serve as the clear text. The data communication key is used to secondarily encrypt the digital certificate management request message and the data communication key is used to primarily encrypt the digital certificate management response message.

At this time, the digital certificate management request message being encrypted via the data communication key includes: before the digital certificate management request message is encrypted via the data communication key of the secure data channel, encrypting the certificate request data carried in the digital certificate management request message via the data session key.

At this time, the digital certificate management response message being encrypted via the data communication key includes: encrypting the digital certificate management response message via the data communication key of the secure data channel.

(3) When the security key further includes the data session key, the data session key is used to process the certificate request data for primary encryption, and the data session key is also used to process the certificate response data for first-layer encryption, wherein the session key used for the certificate response data and the certificate request data corresponds to an encryption manner. The data communication key is used to perform secondary encryption respectively on the digital certificate management request message and the digital certificate management response message.

At this time, the digital certificate management request message being encrypted via the data communication key includes: before the digital certificate management request message is encrypted via the data communication key of the secure data channel, encrypting the certificate request data carried in the digital certificate management request message via the data session key.

At this time, the digital certificate management response message being encrypted via the data communication key includes: before the digital certificate management response message is encrypted via the data communication key of the secure data channel, encrypting the certificate response data carried in the digital certificate management response message via the data session key.

In a specific implementation, the digital certificate management confirmation message is processed for encryption. In particular, the data communication key generated at step S201 is used for the encryption, thus effectively improving transmission security of the message.

At step S205, the digital certificate issuing device receives and processes the digital certificate management confirmation message.

In the embodiment of the present disclosure, the digital certificate requesting device may negotiate with the digital certificate issuing device establishment of the secure data channel using the obtained authorization code, generate the security key, and encrypt a message using the generated security key in a message interaction process between the digital certificate requesting device and the digital certificate issuing device, thereby effectively improving security of data transmission, such that it may adapt to automatic application, query, update, revoking and certificate revocation list etc. of the digital certificate under multiple different types of scenes.

In the present disclosure, in a process of interacting a message between the digital certificate requesting device and the digital certificate issuing device, if a response message is not received within a certain time after the message is transmitted, the message needs to be transmitted again.

In another embodiment, when a digital certificate carried in the digital certificate management request message transmitted by the digital certificate requesting device is configured to perform an encryption or a key exchange, the digital certificate issuing device is required to determine whether a public key and a private key pertain to the digital certificate requesting device or not and a digital certificate management verification request message and a digital certificate management verification response message are required to be interacted between the digital certificate issuing device and the digital certificate requesting device. In particular, referring to FIG. 3, FIG. 3 is a flow chart of a digital certificate management method provided by one embodiment of the present disclosure. In the embodiment, as shown in FIG. 3, after step S302, the method may further include the following steps.

At step S303, the digital certificate issuing device receives the digital certificate management request message and uses the secure data channel to transmit to the digital certificate requesting device, the digital certificate management verification request message, the digital certificate management verification request message being encrypted via the data communication key.

In particular, after receiving the digital certificate management request message, the digital certificate issuing device firstly uses the data communication key to decrypt the digital certificate management request message, and performs processing according to the data carried in the digital certificate management request message, and then generates the digital certificate management verification request message.

The digital certificate management verification request message includes certificate verification request information, the certificate verification request information including a contrast value and verification value ciphertext.

At step S304, the digital certificate requesting device receives the digital certificate management verification request message and uses the secure data channel to transmit to the digital certificate issuing device, the digital certificate management verification response message, the digital certificate management verification response message being encrypted via the data communication key;

here the digital certificate management verification request message is encrypted via the data communication key.

At step S305, the digital certificate issuing device receives the digital certificate management verification response message and uses the secure data channel to transmit to the digital certificate requesting device, a digital certificate management response message, the digital certificate management response message being encrypted via the data communication key.

In some embodiments, when data carried in the digital certificate management request message indicates that a digital certificate requested for management is configured to perform an encryption function (i.e. the private key defines a decryption exchange), at this time, generating, by the digital certificate issuing device, the digital certificate management verification request message at step S303, specifically includes:

step S3031 of generating, by the digital certificate issuing device, a verification value, the verification value being encrypted via the public key of the digital certificate requesting device to generate the verification value ciphertext, and the verification value being calculated to generate the contrast value, the verification value ciphertext and the contrast value being used to generate the digital certificate management verification request message.

Step S304 specifically includes:

step S3041 of after the digital certificate requesting device receives the digital certificate management verification request message, firstly using the data communication key to decrypt the digital certificate management verification request message to obtain the verification value ciphertext and the contrast value, using the private key of the digital certificate requesting device to decrypt the verification value ciphertext to obtain the verification value, the verification value being calculated to generate a new contrast value, and determining whether the new contrast value generated through calculation is consistent with the received contrast value or not, if yes, it can be determined that the digital certificate requesting device is capable of authenticating to which the public key and the private key pertain, and using the verification value, the digital certificate management verification response message is generated and transmitted to the digital certificate issuing device through the secure data channel.

Step S305 is specifically:

step S3051 of after the digital certificate issuing device receives the digital certificate management verification response message, firstly using the data communication key to decrypt the digital certificate management verification response message to obtain the verification value, and comparing whether the verification value is consistent with the verification value generated before the digital certificate issuing device transmits the digital certificate management verification request message or not, if yes, the digital certificate issuing device may determine that the public key and the private key pertain to the digital certificate requesting device and the digital certificate management response message is generated and transmitted to the digital certificate requesting device through the secure data channel.

In some embodiments, when data carried in the digital certificate management request message indicates that the digital certificate requested for management is configured to perform a key exchange function (i.e. the public key and the private key define a key exchange), at this time, generating, by the digital certificate issuing device, the digital certificate management verification request message at step S303, specifically includes:

step S3032 of after the digital certificate issuing device exchanges a key with the digital certificate requesting device, generating a shared key; and generating, by the digital certificate issuing device, a verification value, the verification value being encrypted via the shared key to generate the verification value ciphertext, and the verification value being calculated to generate the contrast value, the verification value cipertext and the contrast value being used to generate the digital certificate management verification request message.

It needs to note that in the embodiment, the manner of the digital certificate requesting device and the digital certificate issuing device for exchanging the key is not defined. Both the public key and the private key of the digital certificate requesting device participate in the key exchange.

Step S304 is specifically:

step S3042 of after the digital certificate requesting device receives the digital certificate management verification request message, firstly using the data communication key to decrypt the digital certificate management verification request message to obtain the verification value ciphertext and the contrast value; after the digital certificate requesting device exchanges a key with the digital certificate issuing device, generating a shared key, the shared key being used to decrypt the verification value ciphertext to obtain the verification value, the verification value being calculated to generate a new contrast value; and determining whether the new contrast value is consistent with the received contrast value or not, if yes, it can be determined that the digital certificate requesting device is capable of authenticating to which the public key and the private key pertain, and using the verification value, the digital certificate management verification response message is generated and transmitted to the digital certificate issuing device.

Step S305 is specifically:

step S3052 of after the digital certificate issuing device receives the digital certificate management verification response message, firstly using the data communication key to decrypt the digital certificate management verification response message to obtain the verification value; and comparing whether the verification value is consistent with the verification value generated before the digital certificate issuing device transmits the digital certificate management verification request message or not; if yes, the digital certificate issuing device may determine that the public key and the private key pertain to the digital certificate requesting device and the digital certificate management response message is generated and transmitted to the digital certificate requesting device.

In the embodiment, steps S301 to S302 are executed by referring to steps S201 to S202 and steps S306 to S307 are executed by referring to steps S204 to S205, which are not defined herein.

In the embodiment, the verification value may be a random number or other numbers. The manner of calculating the verification value to generate the contrast value is not limited, which may be a hashing or a cyclic redundancy check (CRC) etc.

In order to facilitate those of ordinary skilled in the art to understand embodiments of the present disclosure under a specific scene more clearly, a specific example will be used below to describe the embodiments of the present disclosure. It needs to note that the specific example is merely for those of ordinary skilled in the art to understand the present disclosure more clearly, but the embodiments of the present disclosure are not defined to the specific example.

Figure 4:
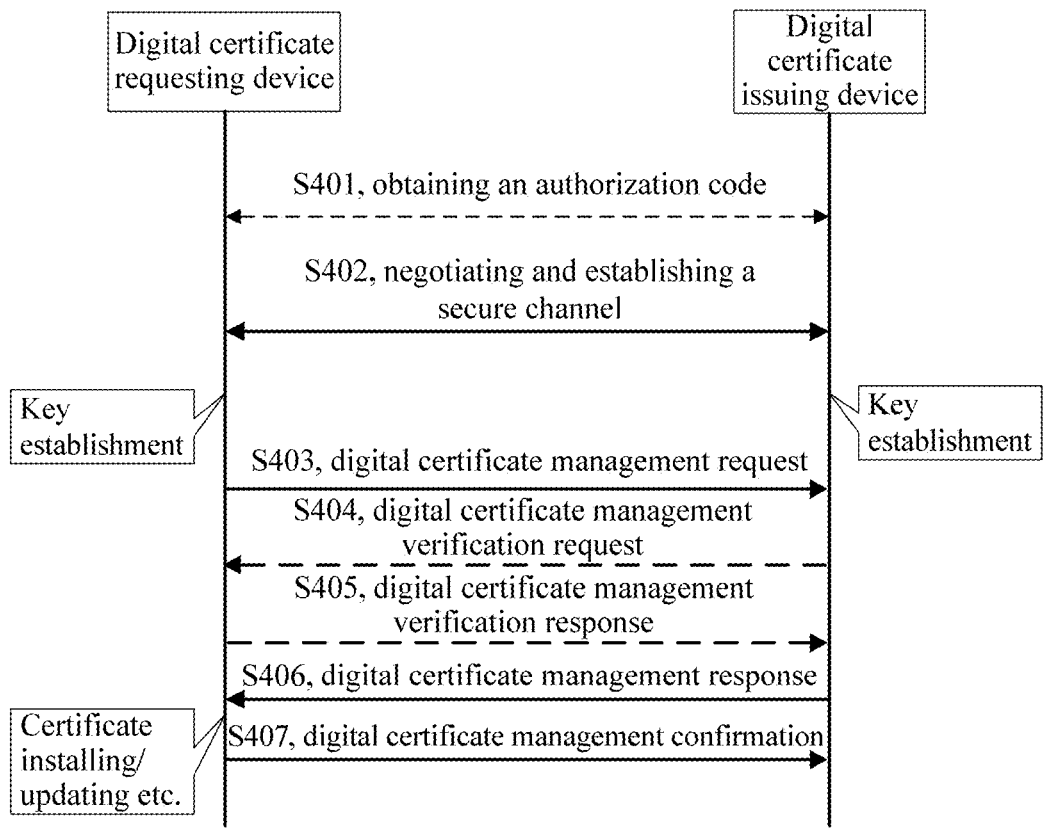
FIG. 4 is a flow chart of a digital certificate management method provided by another embodiment of the present disclosure.
Figure 5:
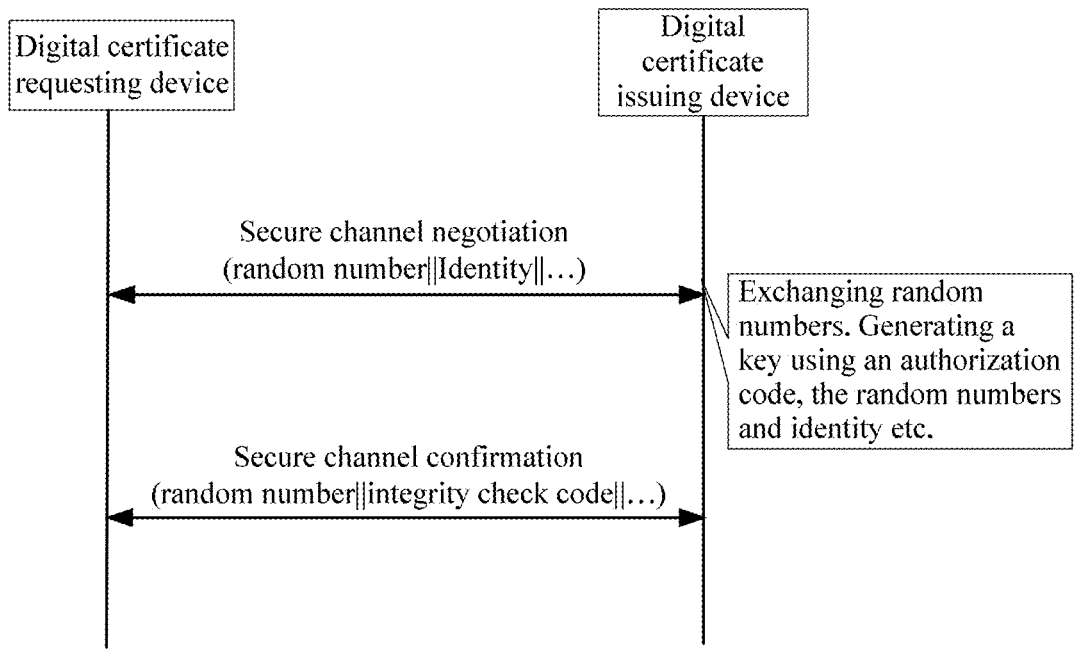
FIG. 5 is a schematic diagram of negotiation and establishment of a secure data channel provided in an embodiment of the present disclosure.

Referring to FIG. 4, FIG. 4 is a flow chart of a digital certificate management method provided by another embodiment of the present disclosure. As shown in FIG. 4, the method may include the following steps.

At step S401, a digital certificate requesting device obtains an authorization code.

In a specific implementation, the digital certificate requesting device requests to a digital certificate issuing device the authorization code for downloading a digital certificate and obtains the authorization code transmitted by the digital certificate issuing device.

At step S402, the digital certificate requesting device negotiates, with the digital certificate issuing device, establishment of a secure data channel using the obtained authorization code and generates a security key.

In a specific implementation, in order to ensure security of information transmission in a digital certificate issuing process, the digital certificate requesting device and the digital certificate issuing device may negotiate establishment of the secure data channel therebetween. The digital certificate requesting device generates the security key for data transmission of the secure data channel using the authorization code.

The present disclosure does not define the manner of establishing the secure channel, as long as the authorization code may be used to generate a shared security key for data transmission. In an implementation, the following manners may be adopted to establish the secure data channel:

At step S402A, the digital certificate requesting device and the digital certificate issuing device make a negotiation on the secure data channel.

At step S402B, the digital certificate requesting device and the digital certificate issuing device generate a security key of the secure channel using the authorization code and the random number and identity information obtained in the negotiation process;

here the security key may include a data communication key and may also include a data session key. The data communication key is configured to encrypt a message for transmission upon interacting the message between the digital certificate requesting device and the digital certificate issuing device in the secure data channel. The data session key is configured to encrypt certificate request data and/or certificate response data carried in the message before the message is transmitted.

At step S402C, the digital certificate requesting device and the digital certificate issuing device authenticate a secure channel confirmation message through an integrity check code.

In a specific implementation, the schematic diagram in FIG. 4 for negotiation and establishment of the secure data channel may be referred to. In particular, the digital certificate requesting device and the digital certificate issuing device making a negotiation on the secure data channel, includes: transmitting, by the digital certificate requesting device, to the digital certificate issuing device, a first random number, and first identity information and receiving a second random number and second identity information transmitted by the digital certificate issuing device, wherein the first random number is generated randomly by the digital certificate requesting device, and the first identity information may specifically be an identity of the digital certificate requesting device, such as an IP address, an MAC address, an e-mail address, a full-domain name character string or an international mobile subscriber identity (IMSI) etc. The second random number is generated randomly by the digital certificate issuing device, and the second identity information may specifically be an identity of the digital certificate issuing device, such as an IP address, an MAC address, an e-mail address, a full-domain name character string or an international mobile subscriber identity (IMSI) etc. The process for the digital certificate requesting device and the digital certificate issuing device to interact the random numbers and identity information may be initiated firstly by the digital certificate requesting device and may also be initiated firstly by the digital certificate issuing device. The present disclosure does not define a specific interaction manner.

In some embodiments, the digital certificate requesting device and the digital certificate issuing device generating the security key of the secure channel using the authorization code and the random numbers and identity information obtained in the negotiation process includes: generating, by the digital certificate requesting device and the digital certificate issuing device, the security key using the authorization code, the first random number, the first identity information, the second random number, and the second identity information. It needs to note that the security key generated at both a digital certificate requesting device side and a digital certificate issuing device side is the same. The security key may include one or more sets of keys. For example, the security key may include a data communication key configured to data transmission, may further include an integrity check key for checking integrity, and may further include a data session key configured to encrypt certificate request data and/or certificate response data.

In some embodiments, the security key further includes an integrity check key. The digital certificate requesting device and the digital certificate issuing device confirming a key of the secure channel through the integrity check code includes: generating, by the digital certificate requesting device and the digital certificate issuing device, an integrity check code using the random numbers and the integrity check key and authenticating a confirmation message of the secure channel using the integrity check code.

At step S403, the digital certificate requesting device uses the secure data channel to transmit to the digital certificate issuing device, a digital certificate management request message.

In a specific implementation, the digital certificate requesting device, after being kept confidential via the secure data channel, transmits to the digital certificate issuing device, the certificate management request message. If the digital certificate requesting device does not have a digital certificate issued by the digital certificate issuing device, the certificate management request message carries certificate information included in a new digital certificate which is required to be applied. If the digital certificate requesting device has included the digital certificate issued by the digital certificate issuing device, information of an existing digital certificate carried in the digital certificate management request message transmitted by the digital certificate requesting device is configured to inquire and update the certificate by the digital certificate issuing device.

In some embodiments, the digital certificate management request message may include digital certificate application information, digital certificate obtaining information, digital certificate revoking information, digital certificate revocation list information and the like. In a specific implementation, the digital certificate application information, the digital certificate obtaining information, the digital certificate revoking information or the digital certificate revocation list information may adopt, but not limited to forms as shown in Table 1.

TABLE 1

Types of information in a digital certificate management request message

| Message | Type value | Meaning (types of information) |
|---|---|---|
| Digital certificate management request message | 2 | Certificate application |
| | 4 | Certificate obtaining |
| | 5 | Certificate revoking |
| | 6 | Certificate revocation list |

For illustration with an example, when type value of information in a digital certificate management request message is 2, the information is specifically certificate application information used to apply for a new digital certificate. When type value of information in a digital certificate management request message is 4, the information is specifically certificate obtaining information used to inquire or update an existing digital certificate. When type value of information in a digital certificate management request message is 5, the information is specifically certificate revoking information used to revoke the existing digital certificate. When type value of information in a digital certificate management request message is 6, the information is specifically certificate revocation list information used to request a certificate revocation list.

In a specific implementation, a field format of certificate application information may adopt, but not limited to forms as shown in Table 2.

TABLE 2

Certificate application information

| Certificate generation manner | Certificate request data |
|---|---|

In a specific implementation, a field format of certificate obtaining information may adopt, but not limited to forms as shown in Table 3.

TABLE 3

Certificate obtaining information

| Issuing device name | Serial number |
|---|---|

In a specific implementation, a field format of certificate revoking information may adopt, but not limited to forms as shown in Table 4.

TABLE 4

Certificate revoking information

| Issuing device name | Serial number | Revoking reasons |
|---|---|---|

In a specific implementation, a field format of certificate revocation list information may adopt, but not limited to forms as shown in Table 5.

TABLE 5

Certificate revocation list information

| Issuing device name |
|---|

The present disclosure does not define certificate request data carried in certificate application information.

In some embodiments, certificate request data carried in the digital certificate management request message include certificate request information, a signature algorithm identity and a signature value;

here, the certificate request information may include a version, a subject name, subject public key information and extension. These information elements are concise and may satisfy basic requirements of issuing a certificate. The signature value is a value obtained after calculating the certificate request information with the private key by using a signature algorithm corresponding to the signature algorithm identity after the digital certificate requesting device generates a public key and private key pair locally. The digital certificate issuing device determines whether the public key and the private key pertain to the digital certificate requesting device or not after checking the signature according to the subject public key information in the certificate request information. It can be authenticated through the signature algorithm identity and the signature value whether the public key and the private key pertain to the entity or not.

In some other embodiments, the certificate request information in the certificate request data may also include more integrated information: a serial number, an issuer name and a validity period. The information may extend a certificate issuing function. For example, a digital certificate applicant requires restricting some specific information etc. of the certificate. In this case, the certificate request data may be encrypted. In particular, the certificate request data are data obtained after encrypting the certificate request information, the signature algorithm identity and the signature value with the generated data session key after the digital certificate requesting device establishes the secure data channel. Further, on the basis of the above embodiment, if the digital certificate requesting device and/or the digital certificate issuing device supports more than two encryption algorithms, the certificate request data may further include an encryption algorithm identity. Correspondingly, the certificate request data specifically include the encryption algorithm identity and data obtained after encrypting the certificate request information, the signature algorithm identity and the signature value by using an encryption algorithm corresponding to the encryption algorithm identity and the data session key. Structural elements of such certificate request data are more integrated and of wider functions.

While authenticating the entity to which the public key and the private key pertain, confidential protection is performed on the certificate request data. Meanwhile, adopting such structure of the certificate request data in a case with the secure data channel may realize confidential protection twice for the certificate request data, thereby further improving security of data transmission.

At step S404, the digital certificate requesting device uses the secure data channel to receive a digital certificate verification request message transmitted by the digital certificate issuing device;

where the digital certificate management verification request message is encrypted via the data communication key.

In a specific implementation, if the digital certificate issuing device is required to determine whether the public key and the private key pertain to the digital certificate requesting device, the digital certificate issuing device, after being kept confidential via the secure data channel, transmits to the digital certificate requesting device, a digital certificate management verification request message. The digital certificate management verification request message carries certificate verification request information used to authenticate to which the public key and the private key of the digital certificate requesting device pertain. The digital certificate management verification request message may adopt, but not limited to forms shown in Table 6.

TABLE 6

Types of information in a digital certificate management verification request message

| Message | Type value | Meaning (types of information) |
| --- | --- | --- |
| Digital certificate management verification request message | 7 | Certificate verification request |

A field format of certificate verification request information may adopt, but not limited to forms shown in Table 7.

TABLE 7

Certificate verification request information

| Contrast value | Verification ciphertext value |
| --- | --- |

In some embodiments, certificate verification request information carried in the digital certificate management verification request message further includes an algorithm identity, a temporary public key and the like.

In a specific implementation, the digital certificate issuing device determines, according to a usage of a digital certificate, whether it is required to authenticate to which the public key and the private key pertain or not. When the digital certificate is configured to perform an encryption or a key exchange, the digital certificate issuing device authenticates to which the public key and the private key pertain. In particular, the digital certificate issuing device generates a verification value, the verification value being calculated to generate a contrast value. According to different usages of the certificate, different keys are used to encrypt the verification value. If the certificate is configured to encrypt, the public key of the digital certificate requesting device is used to encrypt the verification value to generate verification value ciphertext; and if the certificate is configured to perform a key exchange, a shared key is generated after the digital certificate issuing device and the digital certificate requesting device perform a key exchange and the shared key is used to encrypt the verification value to generate verification value ciphertext. The digital certificate issuing device carries the contrast value and the verification value ciphertest in a digital certificate management verification request message.

At step S405, the digital certificate requesting device transmits to the digital certificate issuing device, a digital certificate management verification response message, the digital certificate management verification response message being encrypted via the data communication key.

In a specific implementation, the digital certificate requesting device processes the received digital certificate management verification request message and generates a digital certificate management verification response message.

In some embodiments, when data carried in the digital certificate management request message indicates that a digital certificate requested for management is configured to perform an encryption function (i.e. the private key defines a decryption exchange), after receiving the digital certificate management verification request message, the digital certificate requesting device firstly uses the data communication key to decrypt the digital certificate management verification request message to obtain the verification value ciphertext and the contrast value, uses the private key of the digital certificate requesting device to decrypt the verification value ciphertext to obtain a verification value, the verification value being calculated to generate a new contrast value, and determines whether the new contrast value generated through calculation is consistent with the received contrast value or not; if yes, it can be determined that the digital certificate requesting device is capable of authenticating to which the public key and the private key pertain, and using the verification value, the digital certificate management verification response message is generated.

In some embodiments, when data carried in the digital certificate management request message indicates that a digital certificate requested for management is configured to perform a key exchange function (i.e. the public key and the private key define a key exchange), after receiving the digital certificate management verification request message, the digital certificate requesting device firstly uses the data communication key to decrypt the digital certificate management verification request message to obtain the verification value ciphertext and the contrast value. The digital certificate requesting device generates, after exchanging a key with the digital certificate issuing device, a shared key, the shared key being used to decrypt the verification value ciphertext to obtain the verification value, the verification value being calculated to generate a new contrast value, and determines whether the new contrast value is consistent with the received contrast value or not; if yes, it can be determined that the digital certificate requesting device is capable of authenticating to which the public key and the private key pertain, and using the verification value, the digital certificate management verification response message is generated.

In a specific implementation, the digital certificate requesting device, after being kept confidential via the secure data channel, transmits to the digital certificate issuing device, a certificate management verification response message. The digital certificate management verification response message includes certificate verification response information. The digital certificate management verification response message may adopt, but not limited to forms shown in Table 8.

TABLE 8

Types of information in a digital certificate management verification response message

| Message | Type value | Meaning (types of information) |
|---|---|---|
| Digital certificate management verification response message | 8 | Certificate verification response |

A field format of certificate verification response information may adopt, but not limited to forms shown in Table 9.

TABLE 9

Certificate verification response information

Verification value

At step S406, the digital certificate requesting device uses the secure data channel to receive a digital certificate management response message transmitted by the digital certificate issuing device, here the digital certificate management response message is encrypted via the data communication key.

Further, the digital certificate requesting device determines a digital certificate for use according to requirements.

In a specific implementation, the digital certificate issuing device, after being kept confidential via the secure data channel, transmits to the digital certificate requesting device, a certificate management response message. When the digital certificate issuing device determines that the digital certificate requesting device is required to apply for a new digital certificate, the digital certificate management response message includes a new digital certificate generated by the digital certificate issuing device according to certificate request data included in digital certificate application information. When the digital certificate issuing device determines that the digital certificate requesting device is required to inquire or update an existing digital certificate, the digital certificate management response message carries the inquired or updated digital certificate.

In a specific implementation, the digital certificate issuing device makes a determination and processing according to types of information in a digital certificate management request message. If digital certificate application information is received and it is determined that information of a protected certificate application is present, a new digital certificate is issued according to certificate request data; if information of an existing digital certificate included in certificate obtaining information is present, the existing digital certificate is inquired according to an issuing device name and a serial number; if an issuing device name and a serial number included in certificate revoking information are present, the existing digital certificate is revoked according to the issuing device name and the serial number; and if a certificate revocation list is present, the certificate revocation list is inquired according to an issuing device name. The digital certificate issuing device carries the above certificates in a digital certificate management response message. The digital certificate management response message may adopt, but not limited to forms shown in Table 10.

TABLE 10

Types of information in a digital certificate management response message

| Message | Type value | Meaning (types of information) |
|---|---|---|
| Digital certificate management response message | 3 | Certificate response |

A format of certificate response information may adopt, but not limited to forms shown in Table 11:

TABLE 11

Format of certificate response information

| Certificate generation type | Certificate response data |
|---|---| where certificate generation type may list certificate types corresponding to different certificate holders as shown in Table 12:

TABLE 12

Certificate types

| Type value | Meaning |
|---|---|
| 1 | Client certificate |
| 2 | AS certificate |
| 3 | CA certificate |
| 4 | Certificate revocation list | where the AS certificate is an authentication server certificate and the CA certificate is an authorization center certificate.

In a specific implementation, the digital certificate management response message is encrypted. In particular, in the case of having the secure channel, the data communication key generated is used for encryption, thus improving transmission security of a message. It needs to note that the digital certificate management response message may be processed for primary encryption and may also be processed for secondary encryption. For example, if, before the digital certificate management request message is transmitted, a set of keys among the security keys, e.g. the data session key, have been used to encrypt certificate request data included in the digital certificate management request message, upon being transmitted in the secure data channel, the data are processed for secondary encryption using the data communication key. Correspondingly, the digital certificate management response message may also process certificate response data included for secondary encryption respectively using the data session key and the data communication key. Further, if the digital certificate requesting device and/or the digital certificate issuing device supports more than two encryption algorithms, the certificate response data may further include an encryption algorithm identity. Correspondingly, the certificate response data specifically include the encryption algorithm identity and data obtained by encrypting the certificate response data using an encryption algorithm corresponding to the encryption algorithm identity and the data session key.

At step S407, the digital certificate requesting device uses the secure data channel to transmit to the digital certificate issuing device, a digital certificate management confirmation message, the digital certificate management confirmation message being encrypted via the data communication key.

Figure 6:
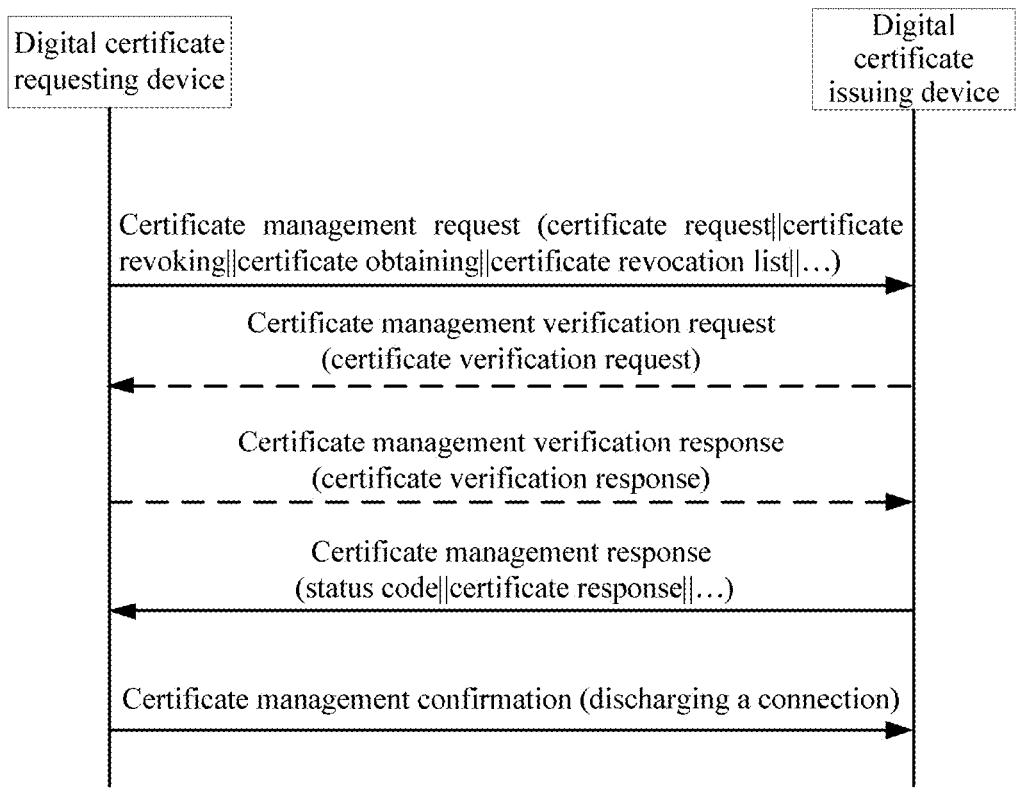
FIG. 6 is a schematic diagram of content of a message in a method for automatic application, query, update and issuing of a digital certificate provided in one embodiment of the present disclosure.

In the embodiment of the present disclosure, the secure and reliable data transmission channel is established through the above S401 and S402 messages, automatic application, query and update of the digital certificate are realized by interacting the above S403, S406 and S407 messages, and authenticating to which the public key and the private key of an entity pertain is realized through interaction between the digital certificate verification request message and the digital certificate management verification response message in the S404 and S405, such that the digital certificate management becomes more effective, securer and more reliable. As shown in FIG. 6, FIG. 6 is a schematic diagram of content of a message in a method for automatic application, query, update and issuing of a digital certificate. As shown in FIG. 6, the digital certificate management request message may specifically include digital certificate application information, digital certificate obtaining information, digital certificate revoking information, digital certificate revocation list information and the like. The digital certificate management response message may include digital certificate response information and the like. The digital certificate management confirmation message may be configured to discharge a connection between the digital certificate requesting device and the digital certificate issuing device. The digital certificate management verification request message may include digital certificate verification request information and the like. The digital certificate management verification response message may include digital certificate verification response information and the like.

The digital certificate management method provided in the present disclosure is described above from the digital certificate requesting device side. It may be understood by those of ordinary skilled in the art that the method provided in the present disclosure may also be applied to the digital certificate issuing device side, and the processing therein may be performed corresponding to the examples shown in FIGS. 2 to 6. For example, the above method being applied to the certificate issuing device side may further include: negotiating, by a digital certificate issuing device, with a digital certificate requesting device, establishment of a secure data channel using an authorization code and generating a security key, wherein the security key includes a data communication key; using the secure data channel to receive a digital certificate management request message transmitted by the digital certificate requesting device, the digital certificate management request message being encrypted via the data communication key; processing the digital certificate management request message and generating a digital certificate management verification request message; using the data communication key to encrypt the digital certificate management verification request message; using the secure data channel to transmit to the digital certificate requesting device, the digital certificate management verification request message, the digital certificate management verification request message being encrypted via the data communication key; using the secure data channel to receive a digital certificate management verification response message transmitted by the digital certificate requesting device, the digital certificate management verification response message being encrypted via the data communication key; processing the digital certificate management verification response message and generating a digital certificate management response message; using the data communication key to encrypt the digital certificate management response message; using the secure data channel to transmit to the digital certificate requesting device, the digital certificate management response message, the digital certificate management response message being encrypted via the data communication key; and using the secure data channel to receive a digital certificate management confirmation message transmitted by the digital certificate requesting device, and processing the digital certificate management confirmation message, the digital certificate management confirmation message being encrypted via the data communication key.

In some embodiments, the negotiating, by a digital certificate issuing device, with a digital certificate requesting device, establishment of a secure data channel using an authorization code and generating a security key, includes: negotiating, by the digital certificate issuing device and the digital certificate requesting device, the secure data channel; generating, by the digital certificate issuing device and the digital certificate requesting device, a security key of the secure channel using the authorization code and the random numbers and identity information obtained in the negotiation process; and authenticating, by the digital certificate issuing device and the digital certificate requesting device, a secure channel confirmation message, through an integrity check code.

In some embodiments, the negotiating, by the digital certificate issuing device and the digital certificate requesting device, the secure data channel includes: transmitting, by the digital certificate issuing device, to the digital certificate requesting device, a second random number and second identity information and receiving a first random number and first identity information transmitted by the digital certificate requesting device.

In some embodiments, the generating, by the digital certificate issuing device and the digital certificate requesting device, the security key of the secure channel using the authorization code and the random numbers and identity information obtained in the negotiation process includes: generating, by the digital certificate issuing device, the security key using the authorization code, the first random number, the first identity information, the second random number, and the second identity information.

The specific implementation can be realized by referring to the methods described in FIGS. 2 to 6.

Figure 7:
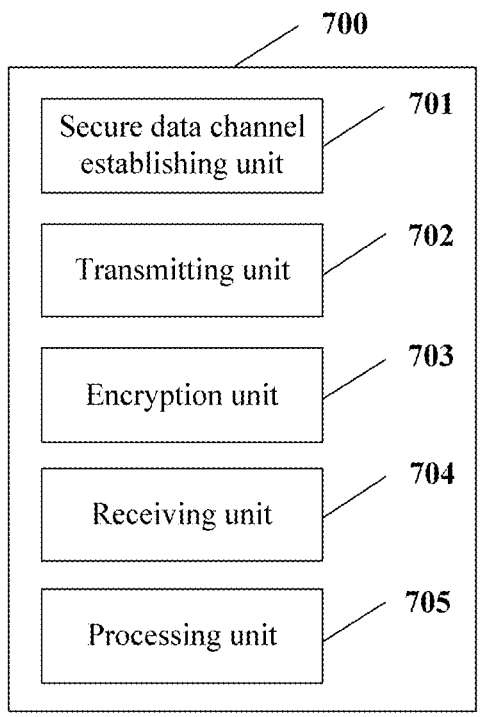
FIG. 7 is a block diagram of a digital certificate requesting device illustrated according to one exemplary embodiment.

Referring to FIG. 7, FIG. 7 is a schematic diagram of a digital certificate requesting device provided by one embodiment of the present disclosure.

A digital certificate requesting device 700 includes:

a secure data channel establishing unit 701 configured to negotiate with a digital certificate issuing device establishment of a secure data channel using an obtained authorization code and generate a security key, wherein the security key includes a data communication key;

a transmitting unit 702 configured to use the secure data channel to transmit, to the digital certificate issuing device, a digital certificate management request message, the digital certificate management request message being encrypted via the data communication key, further configured to use the secure data channel to transmit, to the digital certificate issuing device, a digital certificate management verification response message, the digital certificate management verification response message being encrypted via the data communication key, and further configured to use the secure data channel to transmit, to the digital certificate issuing device, a digital certificate management confirmation message, the digital certificate management confirmation message being encrypted via the data communication key;

an encryption unit 703 configured to use the data communication key to encrypt the certificate management request message, further configured to use the data communication key to encrypt the digital certificate management verification response message, and further configured to use the data communication key to encrypt the digital certificate management confirmation message;

a receiving unit 704 configured to use the secure data channel to receive a digital certificate management verification request message transmitted by the digital certificate issuing device, the digital certificate management verification request message being encrypted via the data communication key, and further configured to use the secure data channel to receive a digital certificate management response message transmitted by the digital certificate issuing device, the digital certificate management response message being encrypted via the data communication key; and a processing unit 705 configured to process the received digital certificate management verification request message and generate the digital certificate management verification response message, and further configured to process the received digital certificate management response message and generate the digital certificate management confirmation message.

In some embodiments, the encryption unit 703 is specifically configured to: use the data communication key of the secure data channel to encrypt the digital certificate management verification response message.

In some embodiments, the digital certificate management verification request message received by the receiving unit 704 includes certificate verification request information, the certificate verification request information including a contrast value and verification value ciphertext.

In some embodiments, when data carried in the digital certificate management request message indicates that a digital certificate requested for management is configured to perform an encryption function, the processing unit 705 is specifically configured to:

after receiving the digital certificate management verification request message, firstly use the data communication key to decrypt the digital certificate management verification request message to obtain the verification value ciphertext and the contrast value; use a private key of the digital certificate requesting device to decrypt the verification value ciphertext to obtain the verification value, the verification value being calculated to generate a new contrast value, and determine whether the new contrast value generated through calculation is consistent with the received contrast value or not; if yes, it can be determined that the digital certificate requesting device is capable of authenticating to which a public key and the private key pertain, and using the verification value, the digital certificate management verification response message is generated;

the digital certificate management verification response message including certificate verification response information.

In some embodiments, when data carried in the certificate management request message indicates that a digital certificate requested for management is configured to perform a key exchange function, the processing unit 705 is specifically configured to:

after receiving the digital certificate management verification request message, firstly use the data communication key to decrypt the digital certificate management verification request message to obtain the verification value ciphertext and the contrast value; after the digital certificate requesting device exchanges a key with the digital certificate issuing device, generate a shared key, the shared key being used to decrypt the verification value ciphertext to obtain the verification value, the verification value being calculated to generate a new contrast value; and determine whether the new contrast value is consistent with the received contrast value or not; if yes, it can be determined that the digital certificate requesting device is capable of authenticating to which the public key and the private key pertain, and using the verification value, the digital certificate management verification response message is generated.

In some embodiments, certificate request data carried in the digital certificate management request message transmitted by the transmitting unit 702 include certificate request information, a signature algorithm identity and a signature value. The certificate request information includes a version, a subject name, subject public key information and extension. The encryption unit 703 is specifically configured to: use the data communication key of the secure data channel to encrypt the digital certificate management request message.

In some embodiments, the encryption unit 703 is further configured to: when the security key also includes a data session key, before the digital certificate management request message is encrypted via the data communication key of the secure data channel, encrypt the certificate request data carried in the digital certificate management request message using the data session key;

where, the certificate request information also includes: a serial number, an issuer name and a validity period.

Further, when the digital certificate requesting device supports more than two encryption algorithms, the certificate request data transmitted by the transmitting unit 702 further include an encryption algorithm identity, and specifically include the encryption algorithm identity and data obtained after encrypting the certificate request information, the signature algorithm identity and the signature value using an encryption algorithm corresponding to the encryption algorithm identity and the data session key. Correspondingly, the encryption unit 703 is further specifically configured to: encrypt the certificate request information, the signature algorithm identity and the signature value using an encryption algorithm corresponding to the encryption algorithm identity and the data session key.

In some embodiments, the transmitting unit 702 includes a first transmitting unit configured to use the secure data channel to transmit to the digital certificate issuing device digital certificate application information for application of a new digital certificate, the digital certificate application information including a certificate generation manner and certificate request data; and/or a second transmitting unit configured to use the secure data channel to transmit to the digital certificate issuing device digital certificate obtaining information for inquiring or updating an existing digital certificate, the digital certificate obtaining information including an issuing device name and a serial number field; and/or a third transmitting unit configured to use the secure data channel to transmit to the digital certificate issuing device digital certificate revoking information for application of revoking the existing digital certificate, the digital certificate revoking information including an issuing device name, a serial number and a revoking reason field; and/or a fourth transmitting unit configured to use the secure data channel to transmit to the digital certificate issuing device digital certificate revocation list information for requesting a digital certificate revocation list, the digital certificate revocation list information including an issuing device name field.

In some embodiments, the secure data channel establishing unit 701 includes: a negotiating unit configured to negotiate with the digital certificate issuing device, establishment of the secure data channel; a key generation unit configured to generate a security key of the secure channel with the digital certificate issuing device using the authorization code and the random numbers and identity information obtained in a negotiation process; and a key confirmation unit configured to authenticate, with the digital certificate issuing device, a secure channel confirmation message, through an integrity check code.

In some embodiments, the negotiating unit is specifically configured to transmit to the digital certificate issuing device, a first random number and first identity information, and receive a second random number and second identity information transmitted by the digital certificate issuing device. The key generation unit is specifically configured to generate, by the digital certificate requesting device and the digital certificate issuing device, a security key using the authorization code, the first random number, the first identity information, the second random number, and the second identity information.

In some embodiments, the security key generated by the key generation unit further includes an integrity check key. The key confirmation unit is specifically configured to generate, by the digital certificate requesting device and the digital certificate issuing device, an integrity check code using the random numbers and the integrity check key and authenticate a secure channel confirmation message using the integrity check code;

where the setting of each unit or module for the device of the present disclosure can be realized by referring to the methods as shown in FIGS. 2 to 6, which are not described herein. It needs to note that the digital certificate management device may be a separate device and may also be integrated with the digital certificate issuing device or exists as a part of the digital certificate issuing device, which is not defined herein.

Figure 8:
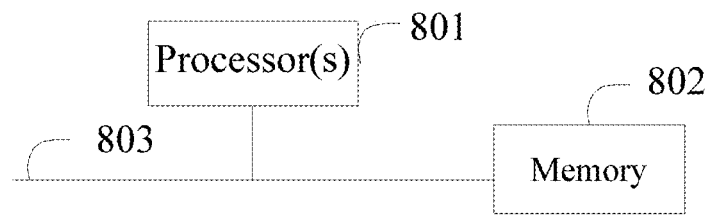
FIG. 8 is a block diagram of a device for digital certificate application illustrated according to another exemplary embodiment.

Referring to FIG. 8, FIG. 8 is a block diagram of a device for digital certificate application provided by another embodiment of the present disclosure, including at least one processor 801 (such as CPU), a memory 802 and at least one communication bus 803 configured to realize connection communication between these devices. The processor 801 is configured to execute an executable module stored in the memory 802, such as a computer program. The memory 802 likely includes a random access memory (RAM) and further likely includes a non-volatile memory, such as at least one magnetic disk memory. One or more programs are stored in the memory and configured to execute, by the one or more processors 801, instructions included in the one or more programs and configured to: negotiate with a digital certificate issuing device establishment of a secure data channel using an obtained authorization code and generate a security key, wherein the security key at least includes a data communication key; generate a digital certificate management request message; use the data communication key to encrypt the digital certificate management request message; use the secure data channel to transmit to the digital certificate issuing device, the digital certificate management request message, the digital certificate management request message being encrypted via the data communication key; use the secure data channel to receive a digital certificate management verification request message transmitted by the digital certificate issuing device, the digital certificate management verification request message being encrypted via the data communication key; process the digital certificate management verification request message and generate a digital certificate management verification response message; use the data communication key to encrypt the digital certificate management verification response message; use the secure data channel to transmit to the digital certificate issuing device, the digital certificate management verification response message, the digital certificate management verification response message being encrypted via the data communication key; use the secure data channel to receive a digital certificate management response message transmitted by the digital certificate issuing device, the digital certificate management response message being encrypted via the data communication key; process the digital certificate management response message and generate a digital certificate management confirmation message; use the data communication key to encrypt the digital certificate management confirmation message; and use the secure data channel to transmit to the digital certificate issuing device, the digital certificate management confirmation message, the digital certificate management confirmation message being encrypted via the data communication key.

In some embodiments, the processor 801 is specifically configured to execute instructions included in the one or more programs and configured to: use the secure data channel to transmit to the digital certificate issuing device, digital certificate application information for application of a new digital certificate, the digital certificate application information including a certificate generation manner and certificate request data.

In some embodiments, the processor 801 is specifically configured to execute instructions included in the one or more programs and configured to: use the secure data channel to transmit to the digital certificate issuing device, digital certificate obtaining information for inquiring or updating an existing digital certificate, the digital certificate obtaining information including an issuing device name and a serial number field.

In some embodiments, the processor 801 is specifically configured to execute instructions included in the one or more programs and configured to: use the secure data channel to transmit to the digital certificate issuing device, digital certificate revoking information for application of revoking the existing digital certificate, the digital certificate revoking information including an issuing device name, a serial number and a revoking reason field.

In some embodiments, the processor 801 is specifically configured to execute instructions included in the one or more programs and configured to: use the secure data channel to transmit to the digital certificate issuing device, digital certificate revocation list information for requesting a digital certificate revocation list, the digital certificate revocation list information including an issuing device name field.

In some embodiments, the processor 801 is specifically configured to execute instructions included in the one or more programs and configured to: negotiate, with the digital certificate issuing device, the secure data channel; generate a security key of the secure channel with the digital certificate issuing device using the authorization code and the random numbers and identity information obtained in a negotiation process; and authenticate, with the digital certificate issuing device, a secure channel confirmation message, through an integrity check code.

In some embodiments, the processor 801 is specifically configured to execute instructions included in the one or more programs and configured to: transmit to the digital certificate issuing device, a first random number and first identity information, and receive a second random number and second identity information transmitted by the digital certificate issuing device, and generate, with the digital certificate issuing device, a security key using the authorization code, the first random number, the first identity information, the second random number, and the second identity information.

In some embodiments, the processor 801 is specifically configured to execute instructions included in the one or more programs and configured to: generate, with the digital certificate issuing device, an integrity check code using the random numbers and an integrity check key and authenticate, a secure channel confirmation message, through the integrity check code.

Figure 9:
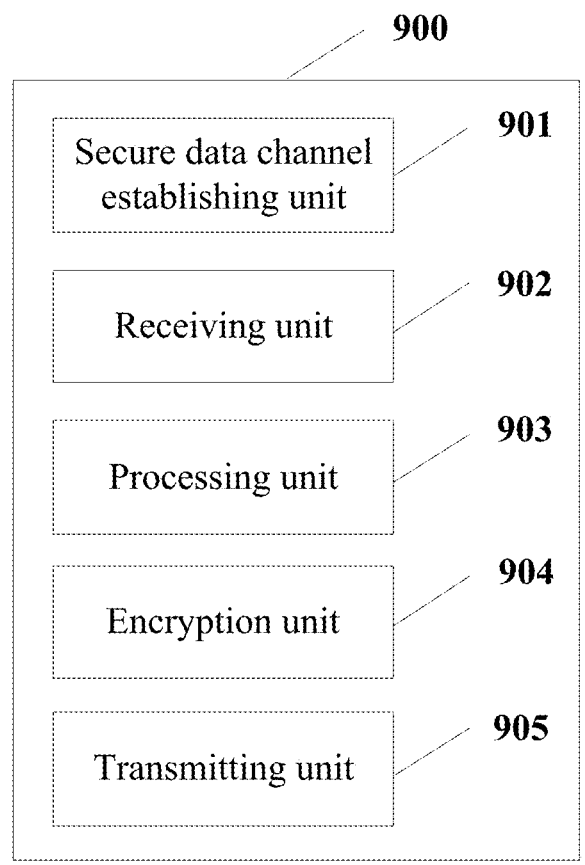
FIG. 9 is a block diagram of a digital certificate issuing device illustrated according to one exemplary embodiment.

Referring to FIG. 9, FIG. 9 is a schematic diagram of a digital certificate issuing device provided by one embodiment of the present disclosure.

A digital certificate issuing device 900 includes:

a secure data channel establishing unit 901 configured to negotiate with a digital certificate requesting device establishment of a secure data channel using an authorization code and generate a security key, wherein the security key includes a data communication key;

a receiving unit 902 configured to receive a digital certificate management request message transmitted by the digital certificate requesting device using the secure data channel, the digital certificate management request message being encrypted via the data communication key, further configured to receive a digital certificate management verification response message transmitted by the digital certificate requesting device using the secure data channel, the digital certificate management verification response message being encrypted via the data communication key, and further configured to receive a digital certificate management confirmation message transmitted by the digital certificate requesting device using the secure data channel, the digital certificate management confirmation message being encrypted via the data communication key;

a processing unit 903 configured to process the received digital certificate management request message and generate a digital certificate management verification request message, further configured to process the received digital certificate management verification response message and generate a digital certificate management response message, and further configured to process the received digital certificate management confirmation message;

an encryption unit 904 configured to use the data communication key to encrypt the digital certificate management verification request message, and further configured to use the data communication key to encrypt the digital certificate management response message; and a transmitting unit 905 configured to use the secure data channel to transmit, to the digital certificate requesting device, the digital certificate management verification request message, the digital certificate management verification request message being encrypted via the data communication key, and further configured to use the secure data channel to transmit, to the digital certificate requesting device, the digital certificate management response message, the digital certificate management response message being encrypted via the data communication key.

In some embodiments, the digital certificate management response message transmitted by the transmitting unit 905 carries certificate response data; and the encryption unit 904 is specifically configured to: use the data communication key of the secure data channel to encrypt the digital certificate management response message, wherein certificate request data carried in the digital certificate management request message received by the receiving unit 902 include certificate request information, a signature algorithm identity and a signature value. The certificate request information includes a version, a subject name, subject public key information and extension.

In some embodiments, the encryption unit 904 is further configured to: when the security key also includes a data session key, before the digital certificate management response message is encrypted via the data communication key of the secure data channel, use the data session key to encrypt the certificate response data carried in the digital certificate management response message, where the certificate request information also includes: a serial number, an issuer name and a validity period.

In some embodiments, when the digital certificate issuing device supports more than two encryption algorithms, the certificate response data transmitted by the transmitting unit 905 further include an encryption algorithm identity, and specifically include the encryption algorithm identity and data obtained after encrypting the certificate response data using an encryption algorithm corresponding to the encryption algorithm identity and the data session key. Correspondingly, the encryption unit 904 is further specifically configured to: encrypt the certificate response data using an encryption algorithm corresponding to the encryption algorithm identity and the data session key.

In some embodiments, the secure data channel establishing unit 901 includes: a negotiating unit configured to negotiate with the digital certificate requesting device, the secure data channel; a key generation unit configured to generate a security key of the secure channel with the digital certificate requesting device, using the authorization code and the random numbers and identity information obtained in a negotiation process; and a key confirmation unit configured to authenticate, with the digital certificate requesting device, a secure channel confirmation message, through an integrity check code.

In some embodiments, the negotiating unit is specifically configured to transmit to the digital certificate requesting device, a second random number and second identity information, and receive a first random number and first identity information transmitted by the digital certificate requesting device. The key generation unit is specifically configured to generate, a security key using the authorization code, the first random number, the first identity information, the second random number, and the second identity information.

In some embodiments, the security key generated by the key generation unit further includes an integrity check key. The key confirmation unit is specifically configured to generate, with the digital certificate requesting device, an integrity check code using the random numbers and the integrity check key and authenticate a secure channel confirmation message using the integrity check code.

Figure 10:
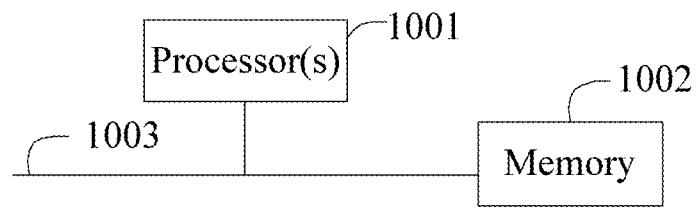
FIG. 10 is a block diagram of a device for digital certificate issuing illustrated according to another exemplary embodiment.

Referring to FIG. 10, FIG. 10 is a block diagram of a device for digital certificate issuing provided by another embodiment of the present disclosure, including at least one processor 1001 (such as CPU), a memory 1002 and at least one communication bus 1003 configured to realize connection communication between these devices. The processor 1001 is configured to execute an executable module stored in the memory 1002, such as a computer program. The memory 1002 likely includes a random access memory (RAM) and further likely includes a non-volatile memory, such as at least one magnetic disk memory. One or more programs are stored in the memory and configured to execute, by the one or more processors 1001, instructions included in the one or more programs and configured to: negotiate with a digital certificate requesting device establishment of a secure data channel using an authorization code and generate a security key, wherein the security key includes a data communication key; use the secure data channel to receive a digital certificate management request message transmitted by the digital certificate requesting device, the digital certificate management request message being encrypted via the data communication key; process the digital certificate management request message and generate a digital certificate management verification request message; use the data communication key to encrypt the digital certificate management verification request message; use the secure data channel to transmit to the digital certificate requesting device, the digital certificate management verification request message, the digital certificate management verification request message being encrypted via the data communication key; use the secure data channel to receive a digital certificate management verification response message transmitted by the digital certificate requesting device, the digital certificate management verification response message being encrypted via the data communication key; process the digital certificate management verification response message and generate a digital certificate management response message; use the data communication key to encrypt the digital certificate management response message; use the secure data channel to transmit to the digital certificate requesting device, the digital certificate management response message, the digital certificate management response message being encrypted via the data communication key; and use the secure data channel to receive a digital certificate management confirmation message transmitted by the digital certificate requesting device, and process the digital certificate management confirmation message, the digital certificate management confirmation message being encrypted via the data communication key.

In some embodiments, the processor 1001 is specifically configured to execute instructions included in the one or more programs and configured to: negotiate, with the digital certificate requesting device, the secure data channel; generate a security key of the secure channel with the digital certificate requesting device, using the authorization code and the random numbers and identity information obtained in a negotiation process; and authenticate, with the digital certificate requesting device, a secure channel confirmation message, through an integrity check code.

In some embodiments, the processor 1001 is specifically configured to execute instructions included in the one or more programs and configured to: transmit to the digital certificate requesting device, a second random number and second identity information, and receive a first random number and first identity information transmitted by the digital certificate requesting device.

In some embodiments, the processor 1001 is specifically configured to execute instructions included in the one or more programs and configured to: generate a security key using the authorization code, the first random number, the first identity information, the second random number, and the second identity information.

Those of ordinary skilled in the art will appreciate that the foregoing method and device are in a corresponding relationship.

After considering the specification and practicing the disclosure herein, it is easy for those of ordinary skilled in the art to think of other embodiments of the present disclosure. The present disclosure aims to cover any variations, uses or adaptive changes of the present disclosure, which are in accordance with the general principles of the present disclosure and include the common knowledge or the conventionally used technical measure in the technical field that are not disclosed in the present disclosure. The specification and embodiments are merely regarded illustrative. The true scope and spirit of the present disclosure are specified by the following claims.

It should be understood that the present disclosure is not limited to the accurate structure which is described above and illustrated in the accompanying figures and various modifications and changes can be made without departing from the scope of the present disclosure. The scope of the present disclosure is merely defined by the appended claims.

Preferred embodiments of the present disclosure are described above, without being used to limit the present disclosure. Any modifications, equivalents, improvements and the like made within the spirit and principles of the present disclosure should be included in the protection scope of the present disclosure.

It needs to note that in the context, relational terms such as the first, the second and the like are used merely to distinguish one entity or operation from another entity or operation, without necessarily requiring or implying existence of any such actual relationship or order between these entities or operations. Moreover, terms of "comprise", "include" or any other variations thereof are intended to cover non-exclusive inclusion, such that a process, method, article or device that includes a series of factors includes not only these elements, but also further includes other factors that are not clearly listed or factors that are inherent to such process, method, article or device. In case of without having too many restrictions, factors defined by a sentence of "comprising one . . . " do not exclude existence of same additional factors that are included in the process, method, article or device of the factors. The present disclosure can be described in the general context of a computer executable instruction executed by a computer, such as a program module. Generally, the program module includes routines, programs, objects, components, data structures, and the like that perform particular tasks or implement particular abstract data types. The present disclosure can also be practiced in distributed computing environments, in which a task is performed through a remote processing device connected via a communication network. In the distributed computing environments, the program module can be located in local and remote computer storage media within a storage device.

The various embodiments in the specification are described in a progressive manner, and the same or similar parts between the various embodiments may refer to each other. Each embodiment focuses on describing differences with other embodiments. In particular, for a device embodiment, since it is substantially similar with a method embodiment, it is described simply. As for a relevant point, refer to a part of instructions of the method embodiment. The device embodiment described above is merely illustrative, wherein the unit which is described as a separating component can be or can also not be separated physically, and a component displayed as a unit can be or can also not be a physical unit, i.e. it can be located at one place or can also be distributed to a plurality of network units. The purpose of the solution of the embodiment can be realized by selecting some or all of the modules according to the actual requirements. In case of without paying the creative effort, those of ordinary skilled in the art can understand and implement the solution. What is described above is only a specific embodiment of the present disclosure. It should be pointed out that for those of ordinary skilled in the art, under the precondition of without departing from the principles of the present disclosure, a plurality of improvements and variations can be further made. These improvements and variations should also be regarded in the protection scope of the present disclosure.

The invention claimed is:

1. A digital certificate management method, comprising:
   negotiating, by a digital certificate requesting device, with a digital certificate issuing device, establishment of a secure data channel using an obtained authorization code and generating a security key, wherein the security key at least comprises a data communication key;
   transmitting, by the digital certificate requesting device, a digital certificate management request message to the digital certificate issuing device using the secure data channel, the digital certificate management request message being encrypted via the data communication key;
   receiving, by the digital certificate issuing device, the digital certificate management request message and transmitting a digital certificate management verification request message to the digital certificate requesting device using the secure data channel, the digital certificate management verification request message being encrypted via the data communication key;
   receiving, by the digital certificate requesting device, the digital certificate management verification request message and transmitting a digital certificate management verification response message to the digital certificate issuing device using the secure data channel, the digital certificate management verification response message being encrypted via the data communication key;
   receiving, by the digital certificate issuing device, the digital certificate management verification response message and transmitting a digital certificate management response message to the digital certificate requesting device using the secure data channel, the digital certificate management response message being encrypted via the data communication key;
   receiving, by the digital certificate requesting device, the digital certificate management response message and transmitting a digital certificate management confirmation message to the digital certificate issuing device using the secure data channel, the digital certificate management confirmation message being encrypted via the data communication key; and
   receiving and processing, by the digital certificate issuing device, the digital certificate management confirmation message.

2. The method according to claim 1, wherein the digital certificate management verification request message being encrypted via the data communication key comprises:
   encrypting the digital certificate management verification request message via the data communication key of the secure data channel; and
   the digital certificate management verification response message being encrypted via the data communication key comprises:
   encrypting the digital certificate management verification response message via the data communication key of the secure data channel.

3. The method according to claim 1, wherein the receiving, by the digital certificate issuing device, the digital certificate management request message, and transmitting the digital certificate management verification request message to the digital certificate requesting device using the secure data channel, specifically comprise:
   after the digital certificate issuing device receives the digital certificate management request message, firstly decrypting the digital certificate management request message by using the data communication key, performing processing according to data carried in the digital certificate management request message, and generating the digital certificate management verification request message;
   wherein the digital certificate management verification request message comprises certificate verification request information, and the certificate verification request information comprises a contrast value and verification value ciphertext.

4. The method according to claim 3, wherein when data carried in the digital certificate management request message indicates that a digital certificate requested for management is configured to perform an encryption function, correspondingly, the generating, by the digital certificate issuing device, the digital certificate management verification request message, specifically comprises:
   generating, by the digital certificate issuing device, a verification value, the verification value being encrypted via a public key of the digital certificate requesting device to generate the verification value ciphertext, generating the contrast value by calculating the verification value, and generating the digital certificate management verification request message using the verification value ciphertext and the contrast value.

5. The method according to claim 4, wherein the receiving, by the digital certificate requesting device, the digital certificate management verification request message, and transmitting the digital certificate management verification response message to the digital certificate issuing device using the secure data channel, specifically comprise:
   after the digital certificate requesting device receives the digital certificate management verification request message, firstly decrypting the digital certificate management verification request message using the data communication key to obtain the verification value ciphertext and the contrast value; decrypting the verification value ciphertext using a private key of the digital certificate requesting device to obtain the verification value, the verification value being calculated to generate a new contrast value; and determining whether the new contrast value generated through calculation is consistent with the received contrast value or not, if yes, determining that the digital certificate requesting device is capable of authenticating to which the public key and the private key pertain, and generating the digital certificate management verification response message by using the verification value and transmitting the digital certificate management verification response message to the digital certificate issuing device through the secure data channel.

6. The method according to claim 5, wherein the receiving, by the digital certificate issuing device, the digital certificate management verification response message, and transmitting the digital certificate management response message to the digital certificate requesting device using the secure data channel, specifically comprise:
   after the digital certificate issuing device receives the digital certificate management verification response message, firstly decrypting the digital certificate management verification response message using the data communication key to obtain the verification value, and comparing whether the verification value is consistent with the verification value generated before the digital certificate issuing device transmits the digital certificate management verification request message or not, if yes, determining by the digital certificate issuing device that the public key and the private key pertain to the digital certificate requesting device, and generating the digital certificate management response message and transmitting the digital certificate management response message to the digital certificate requesting device through the secure data channel.

7. The method according to claim 3, wherein when the data carried in the digital certificate management request message indicates that the digital certificate requested for management is configured to perform a key exchange function, correspondingly, the generating, by the digital certificate issuing device, the digital certificate management verification request message, specifically comprises:

after the digital certificate issuing device exchanges a key with the digital certificate requesting device, generating a shared key; and generating, by the digital certificate issuing device, a verification value, generating the verification value ciphertext by encrypting the verification value via the shared key, and generating the contrast value by calculating the verification value, and generating the digital certificate management verification request message by using the verification value ciphertext and the contrast value.

8. The method according to claim 7, wherein the receiving, by the digital certificate requesting device, the digital certificate management verification request message, and transmitting the digital certificate management verification response message to the digital certificate issuing device using the secure data channel to, specifically comprise:

after the digital certificate requesting device receives the digital certificate management verification request message, firstly decrypting the digital certificate management verification request message using the data communication key to obtain the verification value ciphertext and the contrast value; after the digital certificate requesting device exchanges a key with the digital certificate issuing device, generating a shared key, decrypting the verification value ciphertext using the shared key to obtain the verification value, generating a new contrast value by calculating the verification value; and determining whether the new contrast value is consistent with the received contrast value or not; if yes, determining that the digital certificate requesting device is capable of authenticating to which the public key and the private key pertain, and generating the digital certificate management verification response message using the verification value and transmitting the digital certificate management verification response message to the digital certificate issuing device;

wherein the digital certificate management verification response message comprises certificate verification response information.

9. The method according to claim 8, wherein the receiving, by the digital certificate issuing device, the digital certificate management verification response message, and transmitting the digital certificate management response message to the digital certificate requesting device using the secure data channel, specifically comprise:

after the digital certificate issuing device receives the digital certificate management verification response message, firstly decrypting the digital certificate management verification response message using the data communication key to obtain the verification value; and comparing whether the verification value is consistent with the verification value generated before the digital certificate issuing device transmits the digital certificate management verification request message or not; if yes, determining by the digital certificate issuing device that the public key and the private key pertain to the digital certificate requesting device, and the generating and transmitting the digital certificate management response message to the digital certificate requesting device.

10. A digital certificate requesting device, comprising:

a secure data channel establishing unit configured to negotiate with a digital certificate issuing device, establishment of a secure data channel using an obtained authorization code and generate a security key, wherein the security key at least comprises a data communication key;

a transmitting unit configured to transmit a digital certificate management request message to the digital certificate issuing device using the secure data channel, the digital certificate management request message being encrypted via the data communication key, further configured to transmit a digital certificate management verification response message to the digital certificate issuing device using the secure data channel, the digital certificate management verification response message being encrypted via the data communication key, and further configured to transmit a digital certificate management confirmation message to the digital certificate issuing device using the secure data channel, the digital certificate management confirmation message being encrypted via the data communication key;

an encryption unit configured to encrypt the certificate management request message using the data communication key, to encrypt the digital certificate management verification response message using the data communication key, and to encrypt the digital certificate management confirmation message using the data communication key;

a receiving unit configured to receive a digital certificate management verification request message transmitted by the digital certificate issuing device using the secure data channel, the digital certificate management verification request message being encrypted via the data communication key, and to receive a digital certificate management response message transmitted by the digital certificate issuing device using the secure data channel, the digital certificate management response message being encrypted via the data communication key; and a processing unit configured to process the received digital certificate management verification request message and generate the digital certificate management verification response message, and to process the received digital certificate management response message and generate the digital certificate management confirmation message.

11. The device according to claim 10, wherein the encryption unit is specifically configured to:

to encrypt the digital certificate management verification response message using the data communication key of the secure data channel.

12. The device according to claim 10, wherein the digital certificate management verification request message received by the receiving unit comprises certificate verification request information, the certificate verification request information comprising a contrast value and verification value ciphertext.

13. The device according to claim 12, wherein when data carried in the digital certificate management request message indicates that a digital certificate requested for management is configured to perform an encryption function, the processing unit is specifically configured to:
- after receiving the digital certificate management verification request message, firstly decrypt the digital certificate management verification request message using the data communication key to obtain the verification value ciphertext and the contrast value; decrypt the verification value ciphertext using a private key of the digital certificate requesting device to obtain a verification value, the verification value being calculated to generate a new contrast value; and
- determine whether the new contrast value generated through calculation is consistent with the received contrast value or not; if yes, determine that the digital certificate requesting device is capable of authenticating to which a public key and the private key pertain, and, generate the digital certificate management verification response message using the verification value;
- wherein the digital certificate management verification response message comprises certificate verification response information.

14. The device according to claim 12, wherein when the data carried in the certificate management request message indicates that the digital certificate requested for management is configured to perform a key exchange function, the processing unit is specifically configured to:
- after receiving the digital certificate management verification request message, firstly decrypt the digital certificate management verification request message using the data communication key to obtain the verification value ciphertext and the contrast value; after the digital certificate requesting device exchanges a key with the digital certificate issuing device, generate a shared key, the shared key being used to decrypt the verification value ciphertext to obtain the verification value, the verification value being calculated to generate a new contrast value; and
- determine whether the new contrast value is consistent with the received contrast value or not; if yes, determining that the digital certificate requesting device is capable of authenticating to which the public key and the private key pertain, and generate the digital certificate management verification response message using the verification value.

15. A device for digital certificate application, wherein the device comprises a memory, and one or more programs, wherein the one or more programs are stored in the memory and configured to execute, by one or more processors, instructions comprised in the one or more programs and configured to:
- negotiate, with a digital certificate issuing device, establishment of a secure data channel using an obtained authorization code and generate a security key, wherein the security key at least comprises a data communication key;
- generate a digital certificate management request message;
- encrypt the digital certificate management request message using the data communication key;
- transmit the digital certificate management request message to the digital certificate issuing device using the secure data channel, the digital certificate management request message being encrypted via the data communication key;
- receive a digital certificate management verification request message transmitted by the digital certificate issuing device using the secure data channel, the digital certificate management verification request message being encrypted via the data communication key;
- process the digital certificate management verification request message and generate a digital certificate management verification response message;
- encrypt the digital certificate management verification response message using the data communication key;
- transmit the digital certificate management verification response message to the digital certificate issuing device using the secure data channel, the digital certificate management verification response message being encrypted via the data communication key;
- receive a digital certificate management response message transmitted by the digital certificate issuing device using the secure data channel, the digital certificate management response message being encrypted via the data communication key;
- process the digital certificate management response message and generate a digital certificate management confirmation message;
- encrypt the digital certificate management confirmation message using the data communication key; and
- transmit the digital certificate management confirmation message to the digital certificate issuing device using the secure data channel, the digital certificate management confirmation message being encrypted via the data communication key.

16. A digital certificate issuing device, comprising:
- a secure data channel establishing unit configured to negotiate, with a digital certificate requesting device, establishment of a secure data channel using an authorization code and generate a security key, wherein the security key at least comprises a data communication key;
- a receiving unit configured to receive a digital certificate management request message transmitted by the digital certificate requesting device using the secure data channel, the digital certificate management request message being encrypted via the data communication key, to receive a digital certificate management verification response message transmitted by the digital certificate requesting device using the secure data channel, the digital certificate management verification response message being encrypted via the data communication key, and to receive a digital certificate management confirmation message transmitted by the digital certificate requesting device using the secure data channel, the digital certificate management confirmation message being encrypted via the data communication key;
- a processing unit configured to process the received digital certificate management request message and generate a digital certificate management verification request message, to process the received digital certificate management verification response message and generate a digital certificate management response message, and to process the received digital certificate management confirmation message;
- an encryption unit configured to encrypt the certificate management verification request message using the data communication key, and to encrypt the digital certificate management response message using the data communication key; and
- a transmitting unit configured to transmit the digital certificate management verification request message to the digital certificate requesting device use the secure data channel, the digital certificate management verification request message being encrypted via the data communication key, and to transmit the digital certificate management response message to the digital certificate requesting device using the secure data channel, the digital certificate management response message being encrypted via the data communication key.

17. The device according to claim 16, wherein the encryption unit is specifically configured to:
encrypt the digital certificate management verification request message using the data communication key of the secure data channel.

18. The device according to claim 16 or 17, wherein the processing unit is specifically configured to:
after receiving the digital certificate management request message, firstly decrypt the digital certificate management request message using the data communication key, and perform processing according to data carried in the digital certificate management request message, and then generate the digital certificate management verification request message;
wherein the digital certificate management verification request message transmitted by the transmitting unit comprises certificate verification request information, the certificate verification request information comprising a contrast value and verification value ciphertext.

19. The device according to claim 18, wherein when data carried in the digital certificate management request message indicates that a digital certificate requested for management is configured to perform an encryption function, the processing unit is further specifically configured to:
generate a verification value, the verification value being encrypted via a public key of the digital certificate requesting device to generate the verification value ciphertext, and the verification value being calculated to generate the contrast value, and generate the digital certificate management verification request message using the verification value ciphertext and the contrast value.

20. The device according to claim 19, wherein the processing unit is further specifically configured to:
after receiving the digital certificate management verification response message, firstly decrypt the digital certificate management verification response message using the data communication key to obtain the verification value; and compare whether the verification value is consistent with the verification value generated before the digital certificate issuing device transmits the digital certificate management verification request message or not; if yes, determine that the public key and a private key pertain to the digital certificate requesting device and generate the digital certificate management response message.

21. The device according to claim 18, wherein when the data carried in the digital certificate management request message indicates that the digital certificate requested for management is configured to perform a key exchange function, the processing unit is specifically configured to:
after exchanging a key with the digital certificate requesting device, generate a shared key and generate a verification value, the verification value being encrypted via the shared key to generate the verification value ciphertext, and the verification value being calculated to generate the contrast value, and generate the digital certificate management verification request message the verification value ciphertext and the contrast value.

22. The device according to claim 21, wherein the processing unit is further specifically configured to:
after receiving the digital certificate management verification response message, firstly decrypt the digital certificate management verification response message using the data communication key to obtain the verification value; and compare whether the verification value is consistent with the verification value generated before the digital certificate issuing device transmits the digital certificate management verification request message or not; if yes, determine that the public key and the private key pertain to the digital certificate requesting device and generate the digital certificate management response message.

23. A device for digital certificate issuing, wherein the device comprises a memory, and one or more programs, wherein the one or more programs are stored in the memory and configured to execute, by one or more processors, instructions comprised in the one or more programs and configured to:
negotiate, with a digital certificate requesting device, establishment of a secure data channel using an authorization code and generate a security key, wherein the security key comprises a data communication key;
receive a digital certificate management request message transmitted by the digital certificate requesting device using the secure data channel, the digital certificate management request message being encrypted via the data communication key;
process the digital certificate management request message and generate a digital certificate management verification request message;
encrypt the digital certificate management verification request message using the data communication key;
transmit the digital certificate management verification request message to the digital certificate requesting device using the secure data channel, the digital certificate management verification request message being encrypted via the data communication key;
receive a digital certificate management verification response message transmitted by the digital certificate requesting device using the secure data channel, the digital certificate management verification response message being encrypted via the data communication key;
process the digital certificate management verification response message and generate a digital certificate management response message;
encrypt the digital certificate management response message using the data communication key;
transmit the digital certificate management response message to the digital certificate requesting device using the secure data channel, the digital certificate management response message being encrypted via the data communication key; and
receive a digital certificate management confirmation message transmitted by the digital certificate requesting device using the secure data channel, and process the digital certificate management confirmation message, the digital certificate management confirmation message being encrypted via the data communication key.

* * * * *